2,900,430

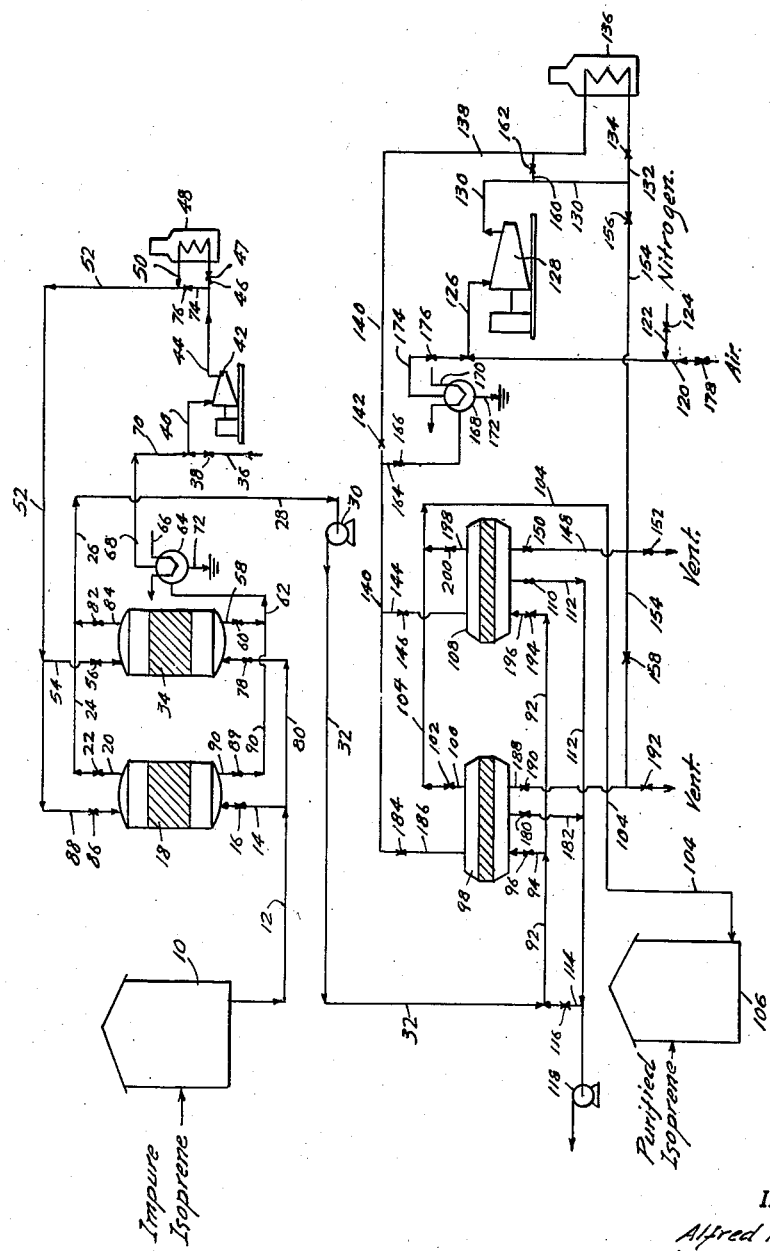

PROCESS FOR THE REMOVAL OF STRAIGHT CHAIN ACETYLENES FROM ISOPRENE

Alfred M. Henke, Springdale, and Harry C. Stauffer, Cheswick, Pa., assignors to Gulf Research & Development Company, Pittsburgh, Pa., a corporation of Delaware Application December 28, 1956, Serial No. 631,230

15 Claims. (Cl. 260—681.5)

This invention relates to the purification of isoprene. More particularly, it is concerned with a process for preparing isoprene of such purity as to be polymerizable in good yields, especially by the newer polymerization techniques which result in isoprene polymers having essentially the structure and characteristics of naturally occurring isoprene polymers such as rubber and balata.

In the directive polymerization of isoprene to a 1,4 all-cis head-to-tail polymer, as described in the copending application of Samuel E. Horne, Jr., Serial No. 472,786, filed December 2, 1954, and in the directive polymerization of isoprene to a 1,4 all-trans head-to-tail polymer, as described in the copending application of C. F. Gibbs et al., Serial No. 503,027, filed April 21, 1955, it has been found that the straight chain acetylenes are potent polymerization retarders or inhibitors, even relatively small amounts exerting an adverse effect on the yields of polymer obtained. These acetylene compounds are found in significant inhibiting amounts in commercially available isoprene as obtained from hydrocarbon conversion processes, for example, the cracking or dehydrogenation of hydrocarbons. Thus, commercial isoprene containing about 95 percent by weight of isoprene may contain as much as about 1 to 4 percent by weight of 2-butyne. Another straight chain acetylene found in commercial isoprene is 1-pentyne, albeit in smaller amounts than 2-butyne. Of the straight chain acetylenes present in isoprene, 2-butyne is regarded as the principal polymerization inhibiting impurity because it predominates in amount.

It has now been found that the straight chain acetylene content of isoprene can be substantially reduced by contacting isoprene containing a straight chain acetylene with molecular sieves having a channel diameter of 5 Angstrom units. In the process of the invention, the straight chain acetylenes are selectively adsorbed in the pores or channels of the molecular sieves, the resulting isoprene after treatment generally containing less than 0.1 percent by weight of straight chain acetylenes and in most instances being substantially free of such compounds. The isoprene so obtained can be polymerized in good yields.

As is known in the art, molecular sieves are crystalline dehydrated zeolites, natural or synthetic, having a well defined physical structure. Chemically, these zeolites are hydrous aluminum silicates generally containing one or more sodium, potassium, calcium, strontium or barium cations, although zeolites containing hydrogen, ammonium or other metal cations are also known. These zeolites have a characteristic three-dimensional aluminum silicate anionic network, the cations neutralizing the anionic charge. Upon dehydration, the three-dimensional lattice network of the crystal is maintained, leaving intercommunicating channels, pores or interstices of molecular dimensions within the crystal lattice. The cross-sectional diameter of such channels can vary, dehydrated three-dimensional zeolites having channels with cross-sectional diameters of about 4, 5 or 6 Angstrom units being known. However, for each zeolite of this type, the narrowest cross-sectional diameter of the channels is a characteristic and is substantially uniform and fixed throughout the crystal. Thus, materials are available having channel diameters of substantially all 4 Angstrom units, all 5 Angstrom units or all 6 Angstrom units, as the case may be. It is therefore conventional in the art to characterize the crystalline, dehydrated, three-dimensional zeolites as molecular sieves of a definite channel diameter, for example, molecular sieves having a channel diameter of 5 Angstrom units, or even more simply, 5 Angstrom molecular sieves. It is a characteristic feature of this invention that the selective adsorption of straight chain acetylenes from isoprene containing them takes place only with 5 Angstrom molecular sieves. Thus, 2-butyne, for example, cannot be separated from isoprene when using either 4 Angstrom or 6 Angstrom molecular sieves.

The process of the invention can be carried out under a wide variety of conditions of contact between the 5 Angstrom molecular sieves and the impure isoprene. Depending upon the amount of straight chain acetylenes present and the capacity of the molecular sieves for this material, the straight chain acetylenes are substantially completely selectively adsorbed and thereby removed from the isoprene.

The impure isoprene can be either in the liquid or vapor state when contacted with the molecular sieves. In either case, the straight chain acetylenic impurities are efficiently removed. Since adsorption of these impurities takes place at normal ambient temperatures and pressures, these conditions are preferred for the purification, particularly when the impure isoprene is in the liquid phase for contact with the molecular sieves. However, temperatures ranging from about —20° to 150° F. and pressures ranging from about 1 to 250 pounds per square inch absolute can be employed. Higher temperatures and pressures than those just given are not preferred because of the possibility of polymerizing the isoprene. It will be noted that isoprene has a boiling point of 93.4° F. to (34.1° C.). Thus, depending upon the ambient conditions, a portion of the isoprene may be in the vapor phase even when liquid phase contact is practiced. This is immaterial, however, since the straight chain acetylenes are efficiently removed in both liquid and vapor phase contact. Of course, if it is desired to insure complete liquid phase contact, superatmospheric pressures can be imposed, for example, up to about 250 pounds per square inch absolute. To achieve vapor phase contact it is only necessary to raise the contact temperature above the boiling point of isoprene, for example, to 100° F. or slightly higher. Instead of raising the temperature, vapor phase contact can be achieved by reducing the pressure under the contact conditions to vaporize the impure isoprene charge.

The particle size of the molecular sieves used in the process of this invention is not critical. Successful results can be obtained with molecular sieve powders having an average particle size of from 0.5 to 5 microns, as well as with pellets having diameters of ⅛ inch and ¹⁄₁₆ inch. Thus, in small scale operations, isoprene can be stirred with the powdered 5 Angstrom molecular sieves, say in the proportion of from about 200 to 400 grams of molecular sieves per mol of straight chain acetylene content, the mixture allowed to settle and an isoprene substantially free from straight chain acetylenes decanted off. For large scale operations, however, it is preferred to employ the pelleted molecular sieves because of greater convenience in handling and to assure proper flow without channeling of the isoprene charge stock through beds of the molecular sieves. For example, when employing the pellets, the isoprene can be purified by employing conventional percolation techniques with either upflow or downflow passage of isoprene through fixed beds of the sieves. Since the sieves become saturated with the straight chain acetylenic impurities after definite amounts thereof have been adsorbed, a fixed bed percolation process is made continuous by providing two or more beds of sieves, one of which is employed for purification while the other is being regenerated to remove the adsorbed material. The regeneration of the sieves will be described in detail hereinafter. It is also possible to achieve continuous purification of isoprene in accordance with the invention by employing moving beds of the molecular sieves in accordance with known techniques. For example, the isoprene is continuously passed through a compact bed of sieves moving downwardly under the influence of gravity in an adsorption zone, purified isoprene is withdrawn from the adsorption zone, sieves containing adsorbed impurities are withdrawn from the bottom of the adsorption zone and are regenerated in a separate regeneration zone, and the regenerated sieves are recycled to the top of the downwardly moving bed in the adsorption zone.

While the contact time, expressed in terms of space velocity, for flow processes of purifying isoprene will vary depending upon such factors as the type of contact process, liquid or vapor phase contact, and the like, in general liquid hourly space velocities of from about 0.3 to 20 volumes of impure isoprene per volume of molecular sieves per hour can be employed. When employing liquid phase percolation of the isoprene through fixed beds of the molecular sieves, space velocities of from about 0.3 to 8 are preferred. The total throughput of impure isoprene before regeneration of the sieves is required will also vary, depending on the straight chain acetylene content of the isoprene. In general, when the molecular sieves have adsorbed from about 6 to 9 percent by weight of straight chain acetylenes they will have become saturated with respect to this material and will no longer separate it from isoprene. When this condition is reached, the sieves are regenerated by removing the adsorbed material before using them again in the purification cycle.

In accordance with this aspect of the invention, 5 Angstrom molecular sieves containing the described adsorbed impurities are regenerated by burning off the adsorbed material with an oxygen-containing gas at a controlled temperature of from about 900° to 1100° F. Since the straight chain acetylene impurities adsorbed in the channels of the molecular sieves polymerize under conditions of regeneration which involve the use of elevated temperatures together with purging with an inert gas, evacuation and/or steaming, it has been found to be impossible to remove the adsorbed material through the use of such treatments.

When regenerating sieves which were employed for liquid phase purification of isoprene, the sieves are first drained of liquid and then evacuated further to reduce the liquid holdup. Obviously, any liquid isoprene remaining on the sieves will undesirably increase the combustion load in the regeneration step. When the sieves have been used in a vapor phase purification of isoprene, the draining and evacuation can be omitted and the sieves simply given a preliminary purge with air or other suitable inert purge gases. The sieves are then contacted with a preheated oxygen-containing gas, heated sufficiently high to initiate combustion of the adsorbed impurities. Since excessive combustion temperatures tend to destroy the physical structure of the sieves and thereby harm their adsorptivity, it is preferred to maintain a combustion temperature not in excess of about 1100° F. This can be accomplished in any suitable manner. For example, when air is used as the combustion initiating gas, nitrogen or other inert gas can be admixed with the air in order to limit the amount of oxygen available for combustion. It has been found that combustion temperatures lower than about 900° F. tend to result in incomplete removal of the adsorbed impurities. Accordingly, the combustion temperature should be maintained between about 900° to 1100° F., good results being obtained with a temperature in the range of 900° to 950° F. After the burn off is completed, the sieves are purged with an inert heated dry gas to remove gaseous combustion products, and finally cooled to room temperature. The regenerated sieves can then be used again for the removal of straight chain acetylenes from impure isoprene as described.

Since molecular sieves adsorb water in preference to all other adsorbates thereby reducing their capacity for removing straight chain acetylenic impurities, it is desirable in both the adsorption and regeneration steps to guard against the adventitious adsorption of water. To this end, the sieves themselves are preferably heated to about 250° to 650° F. prior to use in the adsorption step. Furthermore, the impure isoprene is preferably dehydrated prior to contacting the sieves. This dehydration can be accomplished by passing the isoprene over any suitable desiccant, for example, activated alumina, silica gel, or molecular sieves having a channel diameter other than 5 Angstroms. In the regeneration step, water contamination of the regenerated sieves can occur when the sieves are being cooled after the burn off. To prevent this the cooling can be accomplished by recirculating a substantially dry cooling gas through the sieves and interposing in the stream of cooling gas a desiccant, as described above, or a condenser for condensing water vapor in the cooling gas.

The invention will now be described in connection with the attached drawing in which the single figure shows diagrammatically an apparatus for carrying out one of the embodiments of the invention.

Referring to the drawing, impure liquid isoprene containing water and a straight chain acetylene such as 2-butyne is passed from storage tank 10 through line 12, line 14 and valve 16 into one or more drying chambers 18 containing activated alumina, silica gel, molecular sieves of other than 5 Angstrom channel diameter, or other suitable desiccant. From chamber 18, dry isoprene is passed through line 20, valve 22, and lines 24, 26 and 28 to pump 30 whence it is pumped through line 32 to the remaining portion of the plant about to be described. While chamber 18 is on stream for drying the isoprene, the desiccant in a similar chamber or chambers 34 which had been used for drying isoprene and is of reduced capacity for removing water is being regenerated to remove adsorbed water. This is accomplished by admitting air or other suitable inert drying gas through line 36, valve 38 and line 40 to compressor 42 whence the compressed gas passes through lines 44 and 46 controlled by valve 47 to furnace 48. In furnace 48, the gas is heated and then passes through lines 50, 52 and 54 controlled by valve 56 into chamber 34 where it passes through and removes adsorbed moisture from the desiccant bed. The moisture-containing gas is withdrawn from chamber 34 through line 58 and valve 60 and passes through line 62 to condenser 64. In the condenser the moisture taken from the desiccant is condensed out of the gas by means of cooling water flowing through line 66 and the dry gas then passes through lines 68 and 70 into line 40 for recirculation through the system. Water condensed in the condenser 64 is passed to a sewer through line 72. After a sufficient amount of gas has been introduced for the described drying cycle, valve 38 may be closed. After the desiccant bed in chamber 34 has been dried sufficiently by recirculation of drying gas, the bed is cooled to the temperature required for its drying service by passing cool gas therethrough. To this end, valve 46 leading to the furnace 48 is closed, valve 76 is opened, and the gas is circulated through by-pass line 74 into line 52 and thence into the chamber 34. When cooling of the regenerated desiccant in chamber 34 has been accomplished and removal of adsorbed water from the desiccant in chamber 18 has become necessary, valve 16 is closed and valve 78 in line 80 is opened to allow isoprene from line 12 to flow into chamber 34. Also, valve 82 in line 84 is opened to allow dry isoprene from chamber 34 to flow to line 26. Valve 86 in line 88 is opened to allow hot drying gas to flow through moisture-containing desiccant in chamber 18 whence it is removed by opening valve 89 in line 90. Valves 22 and 60 are also closed. Chamber 34 is now on stream for the drying of isoprene, whereas chamber 18 is on stream for regeneration and cooling. As will be evident to one skilled in the art, the respective duties of chambers 18 and 34 are switched as required and as just described.

Impure dry isoprene from line 32 passes through line 92, line 94 and valve 96 into one or more chambers 98 containing a bed of pelleted 5 Angstrom molecular sieves. After adsorption of straight chain acetylenes by the molecular sieves, the purified isoprene passes through line 100 and valve 102 to line 104 leading to storage tank 106. While chamber 98 is on stream for the purification of isoprene, the sieves in a similar chamber or chambers 108 which had been on purification duty are being regenerated to remove adsorbed impurities. This is accomplished by first draining chamber 108 of liquid isoprene through valve 110 and line 112. The isoprene so removed from chamber 108 passes through line 114 and valve 116 to join the impure isoprene flowing into chamber 98 through line 92. After draining is completed, valve 116 is closed and a suitable vacuum pump 118 is started to form a vacuum on chamber 108 and thereby further reduce any liquid holdup. The isoprene so withdrawn may be recirculated or sent to any other suitable disposition. Pump 118 is then stopped and valve 110 is closed. An oxygen-containing gas such as air is then introduced into the system through line 120 and, in order to control the combustion temperature in the ensuing burn off of adsorbed impurities in chamber 108, is mixed with a diluent gas such as nitrogen introduced as required through line 122 controlled by valve 124. The air-nitrogen mixture passes from line 120 to line 126 and into compressor 128. The compressed air-nitrogen mixture then passes through lines 130, 132 and valve 134 into furnace 136. In the furnace the gaseous mixture is heated to a temperature sufficient to initiate combustion in chamber 108. The heated gaseous mixture leaves furnace 136 through lines 138 and 140, valve 142, line 144 and valve 146, and passes into the top of chamber 108 to initiate and maintain combustion of the adsorbed impurities in the sieves. As has been indicated previously, the amount of nitrogen entering through line 122 is so controlled as to maintain a combustion temperature not greater than 1100° F. and preferably between 900° and 950° F. The hot combustion gases leave chamber 108 through line 148 and valve 150 and are vented through valve 152. After the burn off is completed, the nitrogen stream is stopped by closing valve 124 and chamber 108 is purged of combustion gases by heated air cycling through the system as just described. After purging, the bed of molecular sieves in chamber 108 is cooled to the temperature required for the isoprene purification as follows. Valves 142 and 152 are closed, and air leaving compressor 128 through line 130 is circulated through line 154 by opening valve 156 and into line 148 controlled by valve 150 to chamber 108, valve 158 in line 154 remaining closed. In order to prevent shock cooling and thereby powdering of the sieve pellets in chamber 108, a portion of the air from line 130 may be sent through by-pass line 160 controlled by valve 162 to line 138 for heating in furnace 136, the combined streams joining in line 154. By controlling the amount of air by-passed in this manner, the temperature of the cooling gas may be controlled as required. As cooling of the sieves in chamber 108 continues, decreasing portions of air are by-passed through line 160 until eventually valve 162 is closed. The cooling gas leaves chamber 108 through lines 144 and 140, and passes into line 164 controlled by valve 166. Any water picked up by the cooling gas in its passage through the sieve bed in chamber 108 is condensed in condenser 168 through which cooling water is passed by means of line 170. Condensed water is removed from the condenser by line 172 and passes to the sewer. The cooled gas then passes by means of line 174 controlled by valve 176 to line 126 where it is recycled. After a sufficient amount of air has been introduced to the system for cooling, valve 178 in line 120 may be closed. The sieves in chamber 108 are now ready for purification of isoprene, and when the sieves in chamber 98 are ready for regeneration the operation of the respective chambers is switched. Thus, valves 96 and 102 are closed while valve 180 in line 182 is opened to drain isoprene into line 112. After draining, chamber 98 is evacuated by starting pump 118 as has been described, and valve 180 is then closed. After evacuation, valve 142 is opened and valves 146, 150, 156 and 166 are closed. Valve 184 is opened to permit hot oxygen-containing gas to enter chamber 98 through line 186, the gaseous products of combustion leaving the chamber through line 188, valve 190 and valve 192. When the combustion and purging are completed, valve 192 is closed and valve 158 in line 154 is opened to allow circulation of the cooling gas through chamber 98, as previously described for chamber 108. While regeneration of the sieves in chamber 98 is taking place, isoprene is passed for purification through line 92, valve 194 and line 196 into chamber 108. Purified isoprene leaves chamber 108 through line 198 controlled by valve 200 whence it passes into line 104 as described. The respective operations of chambers 98 and 108 are switched in accordance with the preceding description, as required.

In a typical operation of the system just described, an impure liquid isoprene containing about 2 percent by weight of 2-butyne and 0.1 percent by weight of water is passed at a temperature of 70° F. to the drying chamber 18 containing 4 Angstrom molecular sieves. In the meantime, the 4 Angstrom molecular sieves in chamber 34 having adsorbed about 0.17 pound of water per pound of sieves require regeneration. The regeneration or drying gas, in this case air, is compressed in compressor 42 to a pressure of 50 p.s.i.g. and is then heated in furnace 48 to a temperature of 650° F. prior to passage into chamber 34 for removal of adsorbed moisture. After regeneration of the bed of molecular sieves in chamber 34, the bed is cooled to 70° F. prior to being employed again for drying isoprene. The dry liquid isoprene from chamber 18 is contacted with the 5 Angstrom molecular sieves in chamber 98 at a temperature of 70° F. In the meantime, the molecular sieves in chamber 108 having adsorbed about 0.1 pound of 2-butyne per pound of sieves needs to be regenerated. After draining of liquid isoprene from the sieve bed, a vacuum of 20 mm. of mercury is drawn by vacuum pump 118 to reduce further the liquid holdup. The air-nitrogen mixture (1 volume of air to 4 volumes of nitrogen) employed as the oxygen-containing gas in burning off the adsorbed 2-butyne from the sieves in chamber 108 is compressed in compressor 128 to a pressure of 50 p.s.i.g. and is then heated in furnace 136 to 500° F. The combustion temperature in chamber 108 is maintained between 900° to 950° F. After the burn off and purging with heated gas, the molecular sieves in chamber 108 are cooled to 70° F. prior to being employed again for purifying isoprene.

The following examples are further illustrative of the invention.

EXAMPLE I

An impure isoprene (about 95 percent by weight isoprene) containing 2-butyne is pumped upflow in the liquid state at room temperature through a 1-inch by 48-inch bed of pellets of 5 Angstrom molecular sieves having a pellet diameter of 1/16 of an inch. Chemically, these sieves are a dehydrated, crystalline, synthetic calcium alumino silicate. Prior to use, the sieves are heated at 250° F. for 4 hours. The space velocity is 1.0 volume of impure liquid isoprene per volume of sieves per hour. Percolates are removed from the top of the column in throughput portions of 0.11 volume of isoprene per volume of sieves and each portion is analyzed for 2-butyne. No 2-butyne is observed in the percolate until a total throughput of 3.0 volumes of isoprene per volume of sieves. This throughput represents an amount of 6.3 percent by weight of 2-butyne adsorbed on the sieves. An analysis of the isoprene charge and the typical percolate product before 2-butyne breakthrough at 3.0 throughput is shown in the following table.

*Table I*

COMPOSITION OF CHARGE AND PRODUCT ISOPRENE

| Constituent | Composition, Mol Percent | |
| --- | --- | --- |
| | Charge | Product |
| Group I: n-pentane, pentene-1, 1,4-pentadiene | 0.2 | Trace |
| Group II: 2-butyne | 2.4 | 0.0 |
| Group III: isoprene, cis-pentene, 2-methyl-2-butene | 96.4 | 99.2 |
| Group IV: 1,2-pentadiene, 2,3-pentadiene, trans-1,3-pentadiene | 0.7 | 0.0 |
| Group V: cis-1,3-pentadiene | 0.3 | 0.5 |

Since the above analyses are made by gas partition chromatography which does not distinguish between constituents in each grouping, the analytical results are shown in groups in the above table. It will be seen that the 2-butyne content of the original charge is completely removed.

EXAMPLE II

The same impure isoprene containing 2-butyne, as used in the preceding example, is passed in the vapor phase upflow through a 1-inch by 48-inch bed of pellets of 5 Angstrom molecular sieves having a pellet diameter of 1/16 of an inch. The sieves are of the same type as those of the preceding example. The contact is at room temperature and at a pressure of 160 mm. of mercury. Overhead products are obtained for a liquid volume throughput of 0.6 volume of isoprene per volume of sieves and are found to be free of 2-butyne.

EXAMPLE III

Example I is repeated except that the bed of sieves is a 2-inch by 48-inch bed, the sieves are dried at 300° F. prior to contact with isoprene, the space velocity is 0.5 and the percolates are removed overhead in fractions of 0.38 volume of isoprene per volume of sieves. A total percolate throughput of 4.5 volumes of isoprene per volume of sieves is obtained before any 2-butyne is found in the percolate. This is equivalent to an adsorption of 8.8 percent by weight of 2-butyne on the sieves.

As has been stated, the removal of straight chain acetylenes such as 2-butyne from isoprene in accordance with the present invention leads to far greater polymer yields in the subsequent polymerization of the isoprene. It is noted, however, that in addition to straight chain acetylenes commercial isoprene contains other polymerization inhibitors or retarders, such as cyclopentadiene, which are not removed from the isoprene by the sieve treatment. While the sieve treatment results in a purified isoprene giving much improved yields of polyisoprene, an additional improvement in polymer yield can be obtained by also removing the cyclopentadiene by any suitable treatment. For example, cyclopentadiene can be removed from isoprene by adding a small amount of maleic anhydride, say 0.2 percent by weight, and then flash distilling.

The advantage of removing straight chain acetylenes from impure isoprene is clearly shown in the following polymerization tests. Comparative polymerizations are carried out employing (1) the impure isoprene charge of Examples I and III, (2) the 2-butyne free percolate of Example I, (3) the 2-butyne free percolate of Example III, (4) the 2-butyne free percolate of Example I further treated with 0.2 percent by weight of maleic anhydride and then distilled, and (5) a reference grade isoprene containing no cyclopentadiene or straight chain acetylenes. In each polymerization, there is employed 40 grams of isoprene, 500 ml. of benzene, 10 millimoles per liter of benzene of triisobutyl aluminum and 10 millimoles per liter of benzene of titanium tetrachloride. The polymerizations are conducted under a blanket of nitrogen at a temperature of 41° F. for a period of 24 hours. At the end of the polymerization period, the isoprene polymer is coagulated by adding methanol, washed with additional methanol and dried. The yields of polymer obtained are shown in the following table.

*Table II*

| Charge | Polymer, Percent by Weight of Charge |
| --- | --- |
| (1) Impure isoprene | 24.4 |
| (2) Purified isoprene from Example I | 56.2 |
| (3) Purified isoprene from Example III | 64.3 |
| (4) Purified isoprene from Example I, maleic anhydride treated | 85.6 |
| (5) Reference grade isoprene | 84.9 |

As will be observed from the above table, the removal of 2-butyne from the impure isoprene more than doubles the yield of polyisoprene obtained. A mass spectroscopic examination of the impure isoprene charge and the purified product of Example I shows 0.6 mol percent of cyclopentadiene in each. Removal of this material by additional treatment of the product of Example I with maleic anhydride results in a polymer yield substantially identical with that obtained from the reference grade isoprene.

EXAMPLE IV

The regeneration of 5 Angstrom molecular sieves containing adsorbed 2-butyne is further illustrated in this example.

An impure isoprene containing 2.2 mol. percent of 2-butyne is pumped upflow, at room temperature and a space velocity of 1.1, through a 1-inch by 48-inch bed of pellets of 5 Angstrom molecular sieves having a pellet diameter of 1/16 of an inch. Percolate is continuously removed overhead until 2-butyne is found in the percolate. This occurs at a volume throughput of 5.0. The sieve bed is then drained for 10 minutes and the liquid holdup further reduced by reducing the pressure on the sieve bed to about 1 to 2 mm. of mercury for 15 minutes. The temperature of the bed is then raised to 500° F. while maintaining the vacuum. Thereafter, an air-nitrogen mixture in the proportion of 1 volume of air to 4 volumes of nitrogen is preheated to 500° F. and admitted to the top of the bed for circulation therethrough. Combustion is initiated and the products of combustion are removed from the bottom of the bed along with the air-nitrogen mixture. The burn off temperature is maintained at 900° to 950° F. by adjusting the ratio of air and nitrogen as required. After the burn off is complete, the bed is purged with air preheated to 900° F. and is then cooled to room temperature by introducing dry air into the bottom of the bed and taking it off at the top.

After this regeneration, contact of the same impure isoprene under the same contact conditions described above is repeated. It is then found that a total volume isoprene throughput of 4.4 is obtained prior to finding 2-butyne in the percolate. The sieve bed is then regenerated again by the process just described and, after regeneration, is again employed for removing 2-butyne from the impure isoprene. After this regeneration, the volume throughput of isoprene is 4.0 before 2-butyne appears in the percolate. The sieve bed is again repeatedly alternately regenerated and employed for the removal of 2-butyne, and it is found that the throughput of isoprene obtained in each purification cycle remains substantially constant at about 4.0. Since the sieves are successfully regenerated repeatedly to remove adsorbed 2-butyne, the isoprene purification of the invention is easily made continuous.

Resort may be had to such modifications and variations as fall within the spirit of the invention and the scope of the appended claims.

We claim:

1. A process for reducing the straight chain acetylene content of isoprene which comprises drying isoprene containing a straight chain acetylene and contacting said dried isoprene with dry molecular sieves having a channel diameter of 5 Angstrom units.

2. The process of claim 1, wherein the isoprene is in the liquid phase under the contact conditions.

3. The process of claim 1, wherein the isoprene is in the vapor phase under the contact conditions.

4. The process of claim 1, wherein the straight chain acetylene is 2-butyne.

5. The process of claim 1, wherein the isoprene also contains cyclopentadiene and the isoprene is additionally treated to remove the cyclopentadiene.

6. A process for removing straight chain acetylenes from isoprene containing the same which comprises drying said isoprene, percolating said isoprene in the liquid phase through a fixed bed of dry molecular sieves having a channel diameter of 5 Angstrom units, and recovering isoprene substantially free of said acetylenes.

7. The process of claim 6, wherein the percolation takes place at ambient temperatures and at a liquid hourly space velocity ranging from 0.3 to 8.

8. A process for the removal of straight chain acetylenes from isoprene containing the same which comprises contacting said isoprene with molecular sieves having a channel diameter of 5 Angstrom units until the sieves are of substantially reduced capacity for adsorbing said acetylenes, burning off the adsorbed acetylenes from said sieves to regenerate said sieves, and contacting the regenerated sieves with isoprene containing said acetylenes.

9. A process for the removal of straight chain acetylenes from isoprene containing the same which comprises percolating said isoprene in the liquid phase through a fixed bed of molecular sieves having a channel diameter of 5 Angstrom units until the sieves are of substantially reduced capacity for adsorbing said acetylenes, removing isoprene from said sieves, burning off the adsorbed acetylenes from said sieves in place with an oxygen-containing gas to regenerate said sieves, and resuming the percolating of isoprene containing said acetylenes through said regenerated sieves.

10. The process of claim 9, wherein said burn off takes place at a temperature not exceeding 1100° F.

11. A process for the removal of straight chain acetylenes from isoprene containing the same which comprises percolating said isoprene at ambient temperatures and at a liquid hourly space velocity ranging from 0.3 to 8 through a fixed bed of molecular sieves having a channel diameter of 5 Angstrom units until the sieves are of substantially reduced capacity for adsorbing said acetylenes, removing isoprene from said sieves, burning off the adsorbed acetylenes from said sieves in place with an oxygen-containing gas while maintaining the temperature in the range 900° to 950° F. thereby regenerating the sieves, cooling the regenerated sieves to ambient temperatures, and resuming gthe percolation of isoprene containing said acetylenes through said regenerated sieves as aforesaid.

12. The process of claim 11, wherein there are provided at least two fixed beds of said sieves, at least one of which is on stream for the percolation of said isoprene therethrough and at least one of the others of which is being regenerated.

13. The process of removing a straight chain acetylene adsorbed in the channels of molecular sieves having a channel diameter of 5 Angstrom units which comprises burning off said adsorbed material with an oxygen-containing gas.

14. The process of claim 13, wherein said burn off takes place at a temperature not exceeding 1100° F.

15. The process of claim 13, wherein said burn off takes place at a temperature in the range 900° to 950° F.

References Cited in the file of this patent

UNITED STATES PATENTS

| | | |
|---|---|---|
| 2,467,845 | Morrell et al. | Apr. 19, 1949 |
| 2,753,382 | Hamner | July 3, 1956 |
| 2,818,455 | Ballard et al. | Dec. 31, 1957 |

OTHER REFERENCES

Linde: Chem. and Engr. News, vol. 32 (1954), p. 4786.